(12) United States Patent
Hoffman (10) Patent No.: US 11,773,693 B2
(45) Date of Patent: Oct. 3, 2023

(54) IN-SITU SYSTEM FOR MIXING TWO OR MORE CHEMICAL COMPONENTS DOWNHOLE IN A WELLBORE AND A METHOD EMPLOYING SAME

(71) Applicant: Colton Garrett Hoffman, Elk Point (CA)

(72) Inventor: Colton Garrett Hoffman, Elk Point (CA)

( * ) Notice: Subject to any disclaimer, the term of this patent is extended or adjusted under 35 U.S.C. 154(b) by 0 days.

(21) Appl. No.: 17/082,996

(22) Filed: Oct. 28, 2020

(65) Prior Publication Data

US 2021/0040821 A1 Feb. 11, 2021

Related U.S. Application Data

(63) Continuation of application No. 16/091,797, filed as application No. PCT/CA2017/050416 on Apr. 5, 2017, now Pat. No. 10,851,620.

(60) Provisional application No. 62/318,855, filed on Apr. 6, 2016.

(51) Int. Cl.
| | |
|---|---|
| *E21B 41/00* | (2006.01) |
| *E21B 33/138* | (2006.01) |
| *E21B 33/12* | (2006.01) |
| *E21B 27/02* | (2006.01) |
| *C09K 8/50* | (2006.01) |

(52) U.S. Cl.
CPC ............. *E21B 41/00* (2013.01); *E21B 27/02* (2013.01); *E21B 33/12* (2013.01); *E21B 33/138* (2013.01); *C09K 8/50* (2013.01)

(58) Field of Classification Search
CPC .......... E21B 41/00; E21B 27/02; E21B 33/12; E21B 33/138; C09K 8/50
See application file for complete search history.

(56) References Cited

U.S. PATENT DOCUMENTS

| | | | | | |
|---|---|---|---|---|---|
| 3,727,691 | A | * | 4/1973 | Muecke | ............... E21B 43/25 166/295 |
| 4,064,941 | A | * | 12/1977 | Smith | ............... E21B 33/138 166/300 |
| 5,343,968 | A | * | 9/1994 | Glowka | ............... E21B 21/003 166/334.4 |

\* cited by examiner

*Primary Examiner* — Crystal J. Lee
(74) *Attorney, Agent, or Firm* — Sheridan Ross P.C.

(57) ABSTRACT

A method for providing a mixture downhole at or about a location in an open or cased wellbore. The method includes extending a retrievable delivery sub-system downhole through the wellbore, delivering two or more chemical components downhole through the retrievable delivery sub-system, and mixing the two or more chemical components to provide the mixture at or about the location. The delivery sub-system has a tubing assembly having at least two fluidly separated delivery channels, and each delivery channel is for delivering at least one of the two or more chemical components.

19 Claims, 6 Drawing Sheets

IN-SITU SYSTEM FOR MIXING TWO OR MORE CHEMICAL COMPONENTS DOWNHOLE IN A WELLBORE AND A METHOD EMPLOYING SAME

CROSS-REFERENCE TO RELATED APPLICATIONS

This application is a continuation of U.S. patent application Ser. No. 16/091,797, filed 5 Oct. 2018, which is a national-stage entry under 35 U.S.C. § 371 of PCT application no. PCT/CA2017/050416, filed 5 Apr. 2017, which claims the benefit of U.S. provisional patent application No. 62/318,855, filed 6 Apr. 2016. Each of the above-referenced applications is incorporated herein by reference in its entirety.

FIELD OF THE DISCLOSURE

The present invention relates generally to an in-situ system and a method for mixing two or more chemical components downhole in a wellbore, and in particular to an injection and downhole-mixing system and method for injecting and mixing two or more chemical components downhole in a wellbore for forming a solidified mixture.

BACKGROUND

In downhole operations such as well abandonment, mechanical plug reinforcement and squeeze operations, it is often desirable to form a barrier that is impermeable to wellbore fluids such as water, methane, oil, $H_2S$, $CO_2$, acids and the like, and to pressures caused therefrom. For example, an isolation material or product such as a cement or resin "plug", may be formed as a fluid barrier at a desired downhole location. As is known in traditional methods of forming such a cement or resin "plug", a delay-set mixture of cement or resin having two or more chemical components is first mixed at surface, and then the mixture is pumped into the wellbore through suitable means, such as coiled tubing, tubulars, casing, or the like, to a desired injection point.

After injection, the delivery and injection systems are removed from the injection point. The injected isolation material is maintained in the wellbore about the injection point, and is set or solidified after a period of time to form a solid and impermeable plug. During this process, the injected isolation material has to remain as a fluid or a fluid-like mixture until final removal of the delivery subsystem, which is usually a few hours from the time of mixing the chemical components at surface. Moreover, one usually has to wait for the mixture to become solid and impermeable to reduce negative impact such as thermal, hydrostatic or other forces, which may damage the formed plug.

Traditionally, the solidifying fluid or fluid-like mixture is delivered to the wellbore in one of three methods.

The first method is to deliver the solidifying mixture from surface using the existing wellbore to channel the solidifying mixture to the desired isolation location, for example, by simply pouring the solidifying mixture from surface into the wellbore and allowing it to fall to the desired isolation location which is usually the bottom of the wellbore.

This method is usually employed to deliver the solidifying mixture by pumping into the wellbore under positive pressure, and using the displacement of water or other fluids behind the solidifying mixture to move the "plug" to be formed by the solidifying mixture to the desired isolation location. This method is commonly employed during the drilling, abandonment, and remediation of wells.

However, this method requires that the solidifying mixture is of greater density than the wellbore fluid to allow the solidifying mixture to fall, and is an imprecise method due to the mixing and dilution that may occur with wellbore fluids.

Moreover, the solidifying mixture must travel down the wellbore and the fluid itself and pressures created while pumping it are imposed on wellbore features such as existing perforations between surface and the final resting point of the solidifying mixture. These pressures can be damaging to formations, and the solidifying mixture itself can plug off existing perforations. Furthermore, the solidifying mixture must be formulated to allow sufficient time to be pumped into its final resting point while encountering variables such as wellbore temperature, injection pressures, and wellbore fluids, any of which can alter its solidification time. Other variables are also brought in by the mixing and delivery systems themselves. If premature solidification occurs, the wellbore will be plugged, possibly requiring drilling out and a new operation must be attempted again. Therefore, this method is of limited use, and is generally avoided.

A second and more common method is to deliver the solidifying mixture to the location via multiple removable devices of conveyance and remove the devices of conveyance prior to the mixture becoming solid. Such devices can be small pipes known as "tubulars", coiled tubing, wireline or coil tubing conveyed containers known as "bailers". In this method, the solidifying mixture is delivered to its final location without contacting the uphole section of the wellbore. However, the delivery pressures still act on the entire wellbore. Similar to the above-described first method, this method requires that the solidifying mixture remain in liquid form during the entire time that it is being placed. If premature solidification occurs, the delivery system can become clogged and require cleaning, or in a worst situation, the delivery system can be stuck in the wellbore and require removal or "fishing" from the wellbore. These issues can be very costly to repair and incur significant lost production, or even result in the abandonment of the well.

The third method is to deliver the solidifying mixture such as cement, resin, and the like, to the wellbore via a conveyance device such as a tubular or coiled tubing with a mechanical barrier set about the end of the conveyance in the wellbore. This barrier, often a cement retainer, allows the solidifying mixture to be injected into the wellbore therebelow while it seals the solidifying mixture and created hydraulic pressure from the uphole section of the wellbore. This is beneficial in many cases as the created pressure can damage formations above the desired isolation point, or travelling product may enter these formations and solidify therein, thereby causing plugging of these formations. After the cement is solidified, the method of conveyance (tubing, coiled tubing) is removed from the retainer, which remains in the hole.

In traditional methods, it is important that the mixture is delay-set i.e., setting or solidifying occurs after a required amount of time from the mixing. Generally, the solidification of the mixture is required to occur after the mixture is displaced from the mixing/pumping system, delivery subsystem, and injection tool.

In particular, a common procedure of forming a barrier using a cement or resin mixture includes the following actions: (i) mixture combination at surface in a "cementing unit", (ii) pumping the mixture to the injection point using tubulars or continuous coiled tubing, (iii) displacement and cleanup of the product from the delivery sub-system using water, (iv) removal of the injection and delivery sub-system from contact with the mixture, and (v) maintaining a safety factor that allows for delivery if problems in the process occur. The solidification time of such mixture usually ranges from several minutes to several hours, depending on the properties of the pumping equipment, volume required, desired rates, and maximum pressures, and the like.

Even with a large safety factor, problems with the traditional methods can occur when unexpected events occur including mechanical breakdowns, unexpected well or material properties which accelerate the solidification, premature formation rejection, and/or other stoppages/undesirable conditions that may arise. These unexpected events may cause the mixture to undesirably solidify while remaining in the mixing and pumping equipment, in the delivery sub-system, or in the injection tool. Consequently, the injected mixture is wasted as it has not yet being delivered to the desired injection point. Moreover, equipment and/or the environment can be damaged and/or operator injury may occur.

Other problems associated with traditional methods relate to the deposition of the solidifying mixture in the mixing/pumping equipment or delivery sub-systems. Many solidifying products are difficult to fully remove from the delivery sub-systems and can solidify in small quantities in various systems thereby causing damage to pumps and/or injection tools that are designed for delivering fluids or fluid mixtures.

Another challenge with traditional methods stems from the use of cement retainers. It is often desirable to have a downhole barrier which isolates the delivery sub-system (e.g., coiled tubing) from the injected product/mixture, and keeps the injection pressure isolated from the well thereabove. A cement retainer traditionally serves this purpose. However, traditional cement retainers remain in the wellbore after injection meaning that they have to be left and abandoned in the wellbore with the solidified isolation material thereby significantly increasing the cost of downhole operations. Moreover, if the isolation material needs to be later removed from the well, not only the isolation plug but also the steel/composite cement retainer must be drilled out, which is time consuming and costly.

Other sealing operations that occur outside a cased wellbore may require isolation material with different properties. Such operations may be for example, sealing off a lost-circulation formation, sealing a casing leak, injection behind casing to achieve zone to zone formation isolation, and the like. In these sealing operations, an isolation material that solidifies quickly after exiting the injection systems is generally desirable. In the case of sealing a zone of lost circulation, quick solidification of isolation material can significantly reduce the volumes of the isolation material required, thereby significantly reducing the cost of operation. In the case of achieving zonal isolation behind casing, a quick-setting mixture can seal off fluid channeling that may otherwise occur during solidification of the mixture.

SUMMARY

According to one aspect of this disclosure, there is disclosed a method for forming a solidified isolation material downhole at or about an isolation location in an open or cased wellbore. The solidified isolation material is formed by mixing of two or more chemical components. The method comprises: (i) delivering the two or more chemical components from the surface through a delivery sub-system having at least two fluidly separated delivery channels downhole to the isolation location wherein each delivery channel delivers at least one of the two or more chemical components; and (ii) mixing the two or more chemical components to form a solidifying isolation mixture at or about the isolation location wherein said solidifying isolation mixture solidifies to the solidified isolation material after a period of time.

In some embodiments, said mixing the two or more chemical components to form the solidifying isolation mixture at or about the isolation location comprises: (i) mixing in a downhole injection tool, the two or more chemical components to form a mixture; and (ii) injecting the mixture into the wellbore via a mixing tube, at or about the isolation location to form the solidifying isolation mixture.

In some embodiments, the method further comprises removing the delivery sub-system from the isolation location.

In some embodiments, said removing the delivery sub-system from the isolation location comprises shearing off the mixing tube and removing the delivery sub-system and the downhole injection tool from the isolation location.

In some embodiments, said removing the delivery sub-system from the isolation location comprises shearing off the downhole injection tool and removing the delivery sub-system from the isolation location.

In some embodiments, the method further comprises locating the isolation location.

In some embodiments, the method further comprises sealing with a seal, the isolation location from uphole.

In some embodiments, the method further comprises removing the seal from the isolation location.

In some embodiments, the method further comprises preventing backflow.

In some embodiments, at least one of the two or more chemical components is in a liquid form.

In some embodiments, the two or more chemical components comprise liquid-form resin and liquid-form hardener.

In some embodiments, at least one of the two or more chemical components is in a gas form.

According to another aspect of this disclosure, there is disclosed a system for forming a solidified isolation material downhole at or about an isolation location in an open or cased wellbore. The solidified isolation material is formed by mixing two or more chemical components. The system comprises: (i) a delivery sub-system having at least two fluidly separated delivery channels wherein each delivery channel delivers at least one of the two or more chemical components from surface downhole to the isolation location; and (ii) a downhole injection tool coupled to the delivery sub-system for receiving the two or more chemical components therefrom and injecting the received two or more chemical components into the wellbore at or about the isolation location for forming the solidified isolation material thereabout.

In some embodiments, the downhole injection tool comprises a mixing tube for injecting the two or more chemical components into the wellbore at or about the isolation location.

In some embodiments, the mixing tube is disposable.

In some embodiments, the downhole injection tool comprises a mixing chamber for mixing the two or more chemical components to form a solidifying isolation mixture before injection.

In some embodiments, the downhole injection tool comprises at least one pressure-driven one-way valve for each delivery channel for preventing backflow.

In some embodiments, the downhole injection tool comprises a shear section breakable under a predefined pulling force applied thereto.

In some embodiments, the system further comprises a locating component for locating the isolation location.

In some embodiments, the system further comprises a seal for sealing the isolation location from uphole.

In some embodiments, at least one of the two or more chemical components is in a liquid form.

In some embodiments, the two or more chemical components comprise liquid-form resin and liquid-form hardener.

In some embodiments, at least one of the two or more chemical components is in a gas form.

DETAILED DESCRIPTION

The embodiments of the present disclosure relate to an injection and downhole-mixing system and method. The injection and downhole-mixing system and method can separately deliver two or more chemical components from the surface into a downhole isolation location within a wellbore. The two or more chemical components are then combined at the downhole isolation location and form an isolation mixture that, after set, forms a solid, impermeable isolation barrier. The system and method disclosed herein isolate the pumping, delivery, and injection sub-systems from contact with the isolation mixture.

With the injection and downhole-mixing method disclosed herein, two or more chemical components may be delivered into a wellbore, mixed therein, and solidified to a solid isolation material impermeable to common wellbore fluids.

In some embodiments, the injection and downhole-mixing method comprises the steps of: (i) locating a desired isolation location in an open hole or cased wellbore; (ii) enabling a seal for sealing the isolation location from uphole; (iii) delivering the two or more chemical components from surface through a delivery sub-system having at least two separate delivery channels downhole to the isolation location; (iv) mixing the two or more chemical components and forming a solidifying isolation mixture at or about the isolation location; and (v) releasing or removing the seal and the delivery sub-system.

In some embodiments, the injection and downhole-mixing method further comprises waiting for the solidifying isolation mixture to solidify.

In some embodiments, the injection and downhole-mixing method further comprises injecting the mixed chemical components through a disposable mixing tube.

In some embodiments, the injection and downhole-mixing method further comprises snapping or shearing off the disposable mixing tube.

In some embodiments, a downhole-mixing system comprises:

(1) Surface equipment for pumping two or more separate streams of chemical components into a delivery sub-system. Example of such surface equipment includes skid-mounted or truck-mounted pumping units such as a triplex pump, a gear pump, or a centrifugal pump;

(2) A delivery sub-system such as tubing, pipe, coil, concentric coil, side-by-side coil, and the like, that delivers the chemical components from surface in separate streams. The delivery sub-system may be flexible (such as coiled tubing) but at the same time, sufficiently strong to bear the weight of the downhole mixing tool and the isolation mixture. The delivery sub-system may withstand high external hydrostatic pressures and high internal injection pressures for example, 7 to 21 MPa or greater.

(3) A downhole injection tool coupled to the delivery sub-system and comprising an injection/mixing tube for sufficiently mixing or combining the chemical components and injecting the mixture to the desired isolation location. The injection/mixing tube may be disposable such that if the injection/mixing tube gets stuck in the solidified isolation material, it may be sheared off for example, by pulling the tool to dispose the injection/mixing tub and retrieve the tool thereabove.

In some embodiments, the downhole injection tool further comprises a connector for attaching to the delivery sub-system.

In some embodiments, the downhole injection tool further comprises a locating component for determining the depth of the downhole injection tool. Examples of the locating component include, but not limited to, a counter, a casing collar locator, a suitable electrical, tension, and/or pulse sensor, and the like.

In some embodiments, the downhole injection tool further comprises a sealing component such as a packer, cup and/or seal, which seals the solidifying isolation mixture from uphole, thereby preventing the assembly from getting stuck in the wellbore.

In some embodiments, the downhole injection tool further comprises one or more pressure-driven one-way valves such as ball-seat valves or check valves that can open under sufficient uphole pressure for preventing individual chemical components or the mixture from backflow or leakage (for example, draining out of the delivery sub-system before arrival at the desired isolation location).

In various embodiments, the two or more chemical components may be delivered downhole through separate delivery channels to a desired mixing point and mixed therein.

The mixture then solidifies and forms an isolation material capable of providing wellbore isolation. Preferably, the chemical components are in liquid and/or gas forms. In some embodiments, the chemical components may be resins, hardeners, epoxies, polymers, resin based gypsum cements, other suitable cements, water, and the like. For example, in some embodiments, dual-component resins may be used. In some other embodiments, silicate and salt water combinations may be used which, when combined, react and form water glass that may be used as an impermeable barrier.

In some embodiments, at least some chemical components may be in a solid form such as in a form of powder or beads. In these embodiments, a gas or liquid form transportation medium such as nitrogen, that generally do not react with the solid form chemical component(s) to form a substantive solid mass to block the delivery channel (for example, they do not react, react very slowly, or the reaction result would not form a substantive solid mass to block the delivery channel), may be used to transport the solid-form chemical component(s) downhole to the desired isolation location. As another example, water may be used for transporting solid-form resin downhole to the desired isolation location. In these embodiments, the solid-form chemical component(s) are first mixed with the transportation medium, the mixture is then delivered downhole through a delivery channel, and mixed with other chemical components delivered through separate channels.

After the chemical components are mixed downhole, the mixture of the chemical components solidifies and forms an impermeable, solid material after a period of time or after sufficient external influence for example, pressure, temperature, vibration, electrical impulse, ultrasonic frequencies, light exposure, and the like.

The solidified isolation material is usually required to meet relevant industry standards, such as AER Directive 20 of Alberta Energy Regulator, which requires the solidified isolation material to have a compressive strength greater than 3.5 MPa after 48 hours, and/or API Cement Standards for example, Class A, B, C, G cement standards, which set limits on properties such as permeability and thermal degradation. However, those skilled in the art will appreciate that in some embodiments and/or use scenarios, the solidified isolation material may not need to meet any industry standards. For example, a soft polymer plug that provides weak isolation may be sufficient in some use scenarios and may be formed downhole using the herein-disclosed method and system.

In some embodiments, cement such as resin-based gypsum cement or Portland cement, may also be used as a chemical component with water as another chemical component for forming a cement barrier. In these embodiments, nitrogen may be used for transporting cement powder downhole. However, the system has to be carefully designed, such as using larger diameter tubulars, for delivering cement powder downhole and avoiding plugging of the cement powder during delivery. The cement may be required to meet relevant standard, such as API Cement Standards.

In the following, examples of the injection and downhole-mixing system are described.

Figure 1:
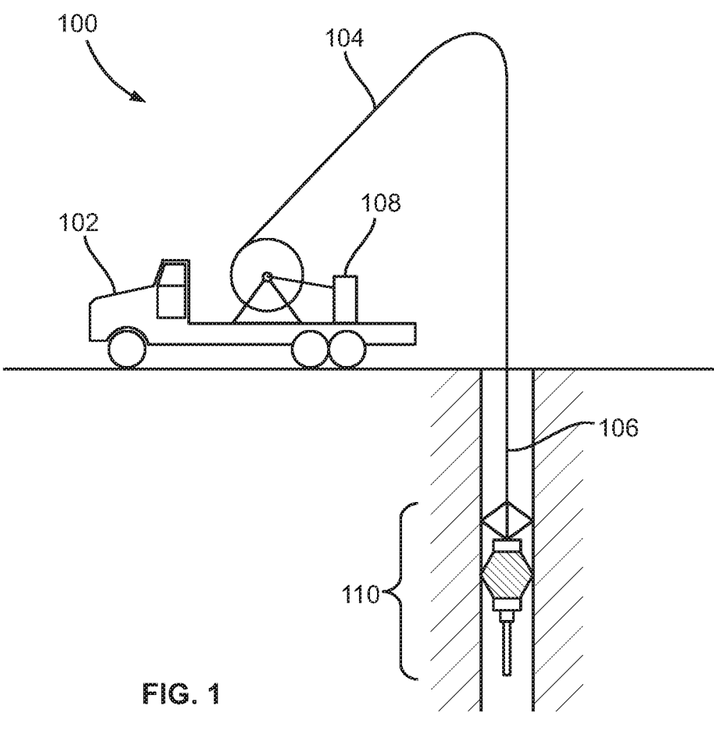
FIG. 1 is a schematic diagram illustrating an injection and downhole-mixing system having a downhole injection tool, according to some embodiments of this disclosure.

Turning now to FIG. 1, an injection and downhole-mixing system is shown, and is generally identified using reference numeral 100. As shown, the downhole-mixing system 100 comprises a coiled tubing deployment device 102, such as a coiled tubing truck on the surface for inserting a delivery sub-system 104 such as a coiled tubing assembly downhole into a wellbore 106. At the surface, a pumping sub-system 108 is coupled to a surface end of the coiled tubing assembly 104 and is in fluid communication therewith. In the wellbore 106, a downhole end of the coiled tubing assembly 104 is coupled to a downhole injection tool 110 and is in fluid communication therewith.

In this embodiment, the injection and downhole-mixing system 100 delivers two chemical components CA and CB, such as resin and hardener, downhole for mixing and forming an isolation material. Preferably, the chemical components CA and CB are in liquid and/or gas forms.

Figure 2:
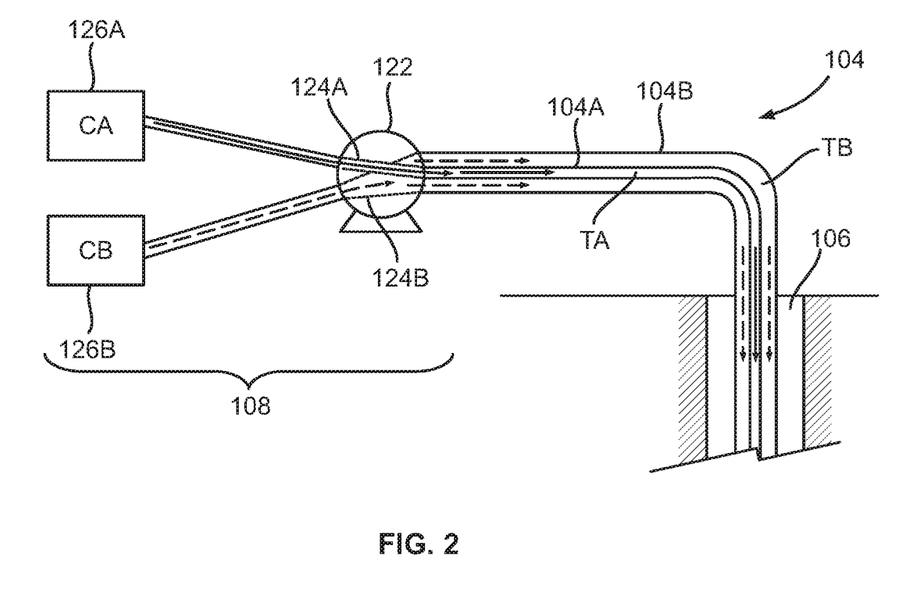
FIG. 2 is a schematic diagram illustrating the surface portion of the injection and downhole-mixing system shown in FIG. 1.

FIG. 2 is a schematic diagram showing a surface portion of the downhole-mixing system 100. As shown, the coiled tubing assembly 104 in this embodiment is a concentric coiled tubing having an inner tubing 104A deployed within an outer tubing 104B. The inner tubing 104A of the concentric coiled tubing assembly 104 forms a first delivery channel TA, and the annulus between the inner and outer coiled tubings 104A and 104B of the concentric coiled tubing assembly 104 forms a second delivery channel TB.

The pumping sub-system 108 in this embodiment comprises a multi-channel pump 122 having two pumping channels 124A and 124B. The pumping channel 124A couples a first source 126A of component CA to the first delivery channel TA of the inner tubing 104A, for pumping the component CA into the wellbore 106. The pumping channel 124B couples a second source 126B of component CB to the second delivery channel TB of the annulus between the inner and outer tubings 104A and 104B, for pumping the component CB into the wellbore 106. The pumping sub-system 108 in this embodiment also measures the ratio of the chemical components CA and CB while pumping them downhole to ensure that the chemical components CA and CB are at the required ratio for the final isolation mixture.

In this embodiment, the coiled tubing device 102 further comprises a counter (not shown) for measuring the length of the coiled tubing inserted into the wellbore 106.

Figure 3:
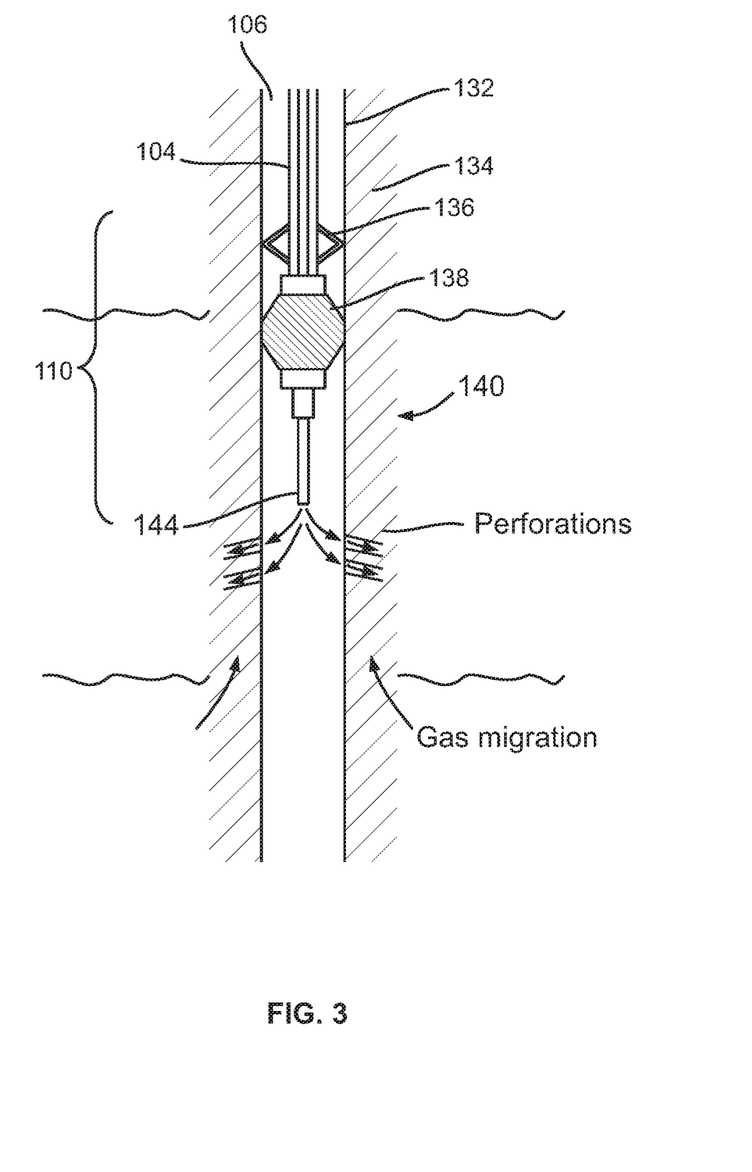
FIG. 3 is a schematic diagram illustrating the downhole injection tool of the injection and downhole-mixing system shown in FIG. 1.

As shown in FIG. 3, in this embodiment, the wellbore 106 is cased having a casing 132 fixed therein by existing cement 134. As shown, the concentric coiled tubing assembly 104 is extended downhole in the wellbore 106, and is coupled to the downhole injection tool 110 at a downhole end thereof.

The downhole injection tool 110 in this embodiment comprises a casing collar locator 136, a packer 138, a mixer 140, and a disposable mixing tube 146.

The casing collar locator 136 is used with the coiled tubing counter on the surface for accurately locating the desired downhole isolation location in the cased wellbore 106 for injecting and mixing the chemical components CA and CB.

The packer 138 seals the wellbore 106 about the desired isolation location for preventing the isolation mixture from travelling uphole, and seals the wellbore thereabove from the downhole pressure. By sealing the wellbore 106 by the packer 138, the isolation mixture is then forced to flow downhole and away from the downhole injection tool 110 to avoid the downhole injection tool 110 getting stuck in the wellbore 106. The packer 138 also keeps potentially high injection pressure from effecting uphole features, and eliminates pressure on the casing above the tool to, for example, improve travel of epoxy behind the casing (in the event of microannular voids). Of course, those skilled in the art will appreciate that in some alternative embodiments, other suitable sealing devices may be used instead of the packer 138.

Each of the casing collar locator 136 and the packer 138 comprises two fluidly separated channels (not shown) coupled to and as parts of the delivery channels TA and TB, respectively.

Figure 4:
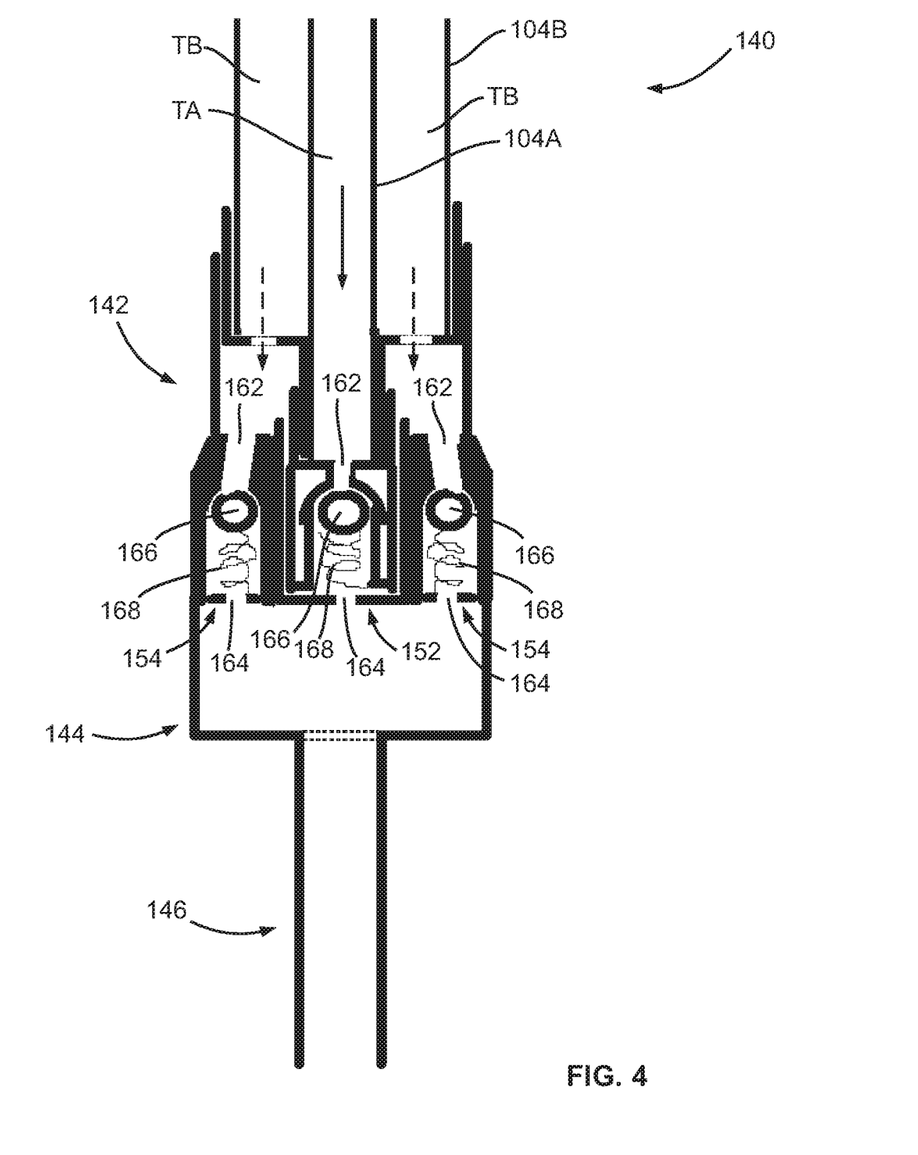
FIG. 4 is a schematic diagram showing an example of a mixer of the downhole injection tool shown in FIG. 3.

FIG. 4 shows an example of the mixer 140. As shown, the mixer 140 in this embodiment comprises a pressure-driven one-way valve assembly 142 having one or more pressure-driven one-way valves 152, 154, such as ball-seat valves or check valves, for each of the delivery channels TA and TB, and a mixing structure 144 downhole to the check valve assembly 142.

In this example, the pressure-driven one-way valve assembly 142 is in the form of a check valve assembly. As shown, the check valve assembly 142 comprises a check valve 152 coupled to the inner delivery channel TA and one or more check valves 154 coupled to the outer delivery channel TB. Each check valve 152, 154 comprises an uphole inlet 162 and a downhole outlet 164. A ball 166 is forced by a spring 168 to sealably close the inlet 162 from a downhole side thereof for preventing backflow and leakage of the chemical components CA and CB. The ball 166 may be biased downhole to open the inlet 162 by a sufficient uphole pressure of the component flow in TA and TB to allow the chemical components TA and TB flow out of the outlet 164 and mixed in the mixing structure 144.

Generally, the mixing structure 144 is a chamber in fluid communication with the delivery channels TA and TB, and merges the delivery channels TA and TB for combining the chemical components CA and CB to form an isolation mixture, which is usually in a liquid form. In this embodiment, the mixer 140 allows easy cleaning, at the surface, of any portion that handles the isolation mixture.

The disposable mixing tube 146 comprises a tortuous path and/or has a small diameter to create a turbulent flow, to promote mixing of the two chemical components CA and CB, and discharges the isolation mixture into the wellbore 106. After the isolation mixture is set, an isolation plug (also denoted as "isolation material") is then formed. In this embodiment, the disposable mixing tube 146 is made of a suitable material such as fiberglass, plastic, metal, or the like, that may be snapped off from hardened isolation material to facilitate tool retrieval.

In use, the coiled tubing assembly 104 and the downhole injection tool 110 are first extended downhole in a wellbore 106. The casing collar locator 136 is used with the coiled tubing counter on the surface for accurately locating the desired downhole isolation location in the cased wellbore 106 for injecting and mixing the chemical components CA and CB. When the desired downhole isolation location is determined, the packer 138 seals the wellbore 106 about the desired isolation location for preventing the isolation mixture from travelling uphole, and seals the wellbore thereabove from the downhole pressure. Then, the pumping sub-system 108 pumps the two or more chemical components CA and CB from the surface through the fluidly separated delivery channels TA and TB of the coiled tubing assembly 104 downhole to the mixer 140 about the desired isolation location. The two or more chemical components CA and CB are then mixed in the mixing structure 144 of the mixer 140, and the mixture is discharged from the disposable mixing tube 146 into the wellbore 106.

After delivering the two or more chemical components CA and CB to the desired isolation location, the coiled tubing assembly 104 and the downhole injection tool 110 may be removed from the wellbore 106, for example, by pulling them to the surface.

After a period of time or after sufficient external influence, for example pressure, temperature, vibration, electrical impulse, ultrasonic frequencies, light exposure, and the like, the mixture of the chemical components CA and CB solidifies within the wellbore 106 and forms an impermeable, solid isolation material at the desired isolation location.

In the event that the disposable mixing tube 146 gets stuck in the solidified or partially solidified isolation material, the disposable mixing tube 146 may be sheared off by pulling the downhole injection tool 110 to detach and dispose the disposable mixing tube 146 and to retrieve the downhole injection tool 110 to the surface.

Those skilled in the art will appreciate that various alternative embodiments are readily available. For example, in some alternative embodiments, the pressure-driven one-way valve assembly 142 may only comprise one check valve 152 located downhole to the mixing structure 144 and coupled thereto, for receiving the isolation mixture and for preventing backflow thereof.

Figure 5:
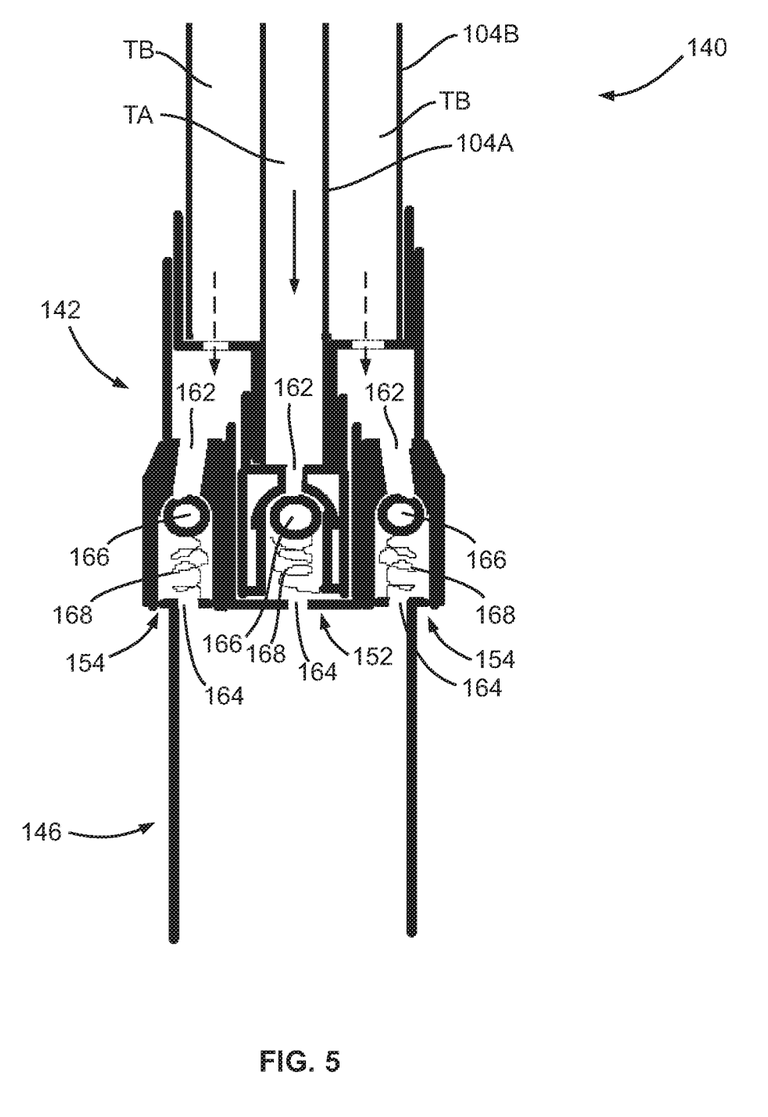
FIG. 5 is a schematic diagram showing an example of a mixer of the downhole injection tool shown in FIG. 3, according to some alternative embodiments of this disclosure.

In some alternative embodiments as shown in FIG. 5, the mixer 140 does not comprise a separate mixing structure 144. In these embodiments, the disposable mixing tube 146 also acts as the mixing structure of the mixer 140.

Figure 6:
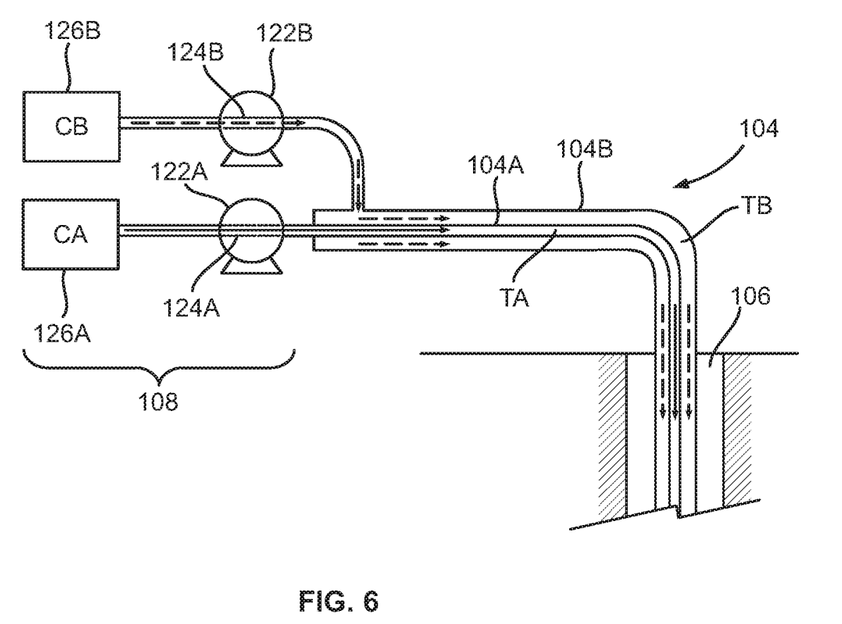
FIG. 6 is a schematic diagram illustrating the surface portion of the injection and downhole-mixing system shown in FIG. 1, according to some alternative embodiments of this disclosure.

In some alternative embodiments as shown in FIG. 6, the pumping sub-system 108 comprises two pumps 122A and 122B forming two pumping channels 124A and 124B. Similar to the embodiment shown in FIG. 2, the pumping channel 124A couples the first source 126A of component CA to the first delivery channel TA of the inner tubing 104A for pumping the component CA into the wellbore 106. The pumping channel 124B couples a second source 126B of component CB to the second delivery channel TB of the annulus between the inner and outer tubings 104A and 104B for pumping the component CB into the wellbore 106.

In some alternative embodiments, the system 100 injects and mixes more than two components. In this embodiment, the components are divided into two non-self-react groups, each non-self-react group comprising one or more components that generally do not react with each other to form a substantive solid mass to block the delivery channel (for example, they do not react or react very slowly or the reaction result would not form a substantive solid mass to block the delivery channel). The two groups of components are then pumped downhole through the delivery channels TA and TB, respectively, to the desired downhole location and are mixed there to form an isolation mixture which is then hardened or solidified to form an isolation plug.

In some alternative embodiments, the system 100 injects and mixes more than two components that can only be divided into more than two non-self-react groups. In these embodiments, the injection and downhole-mixing system 100 uses more than two fluidly separated delivery channels for delivering the chemical components to a desired downhole isolation location, and mixes them therein.

Figure 7:
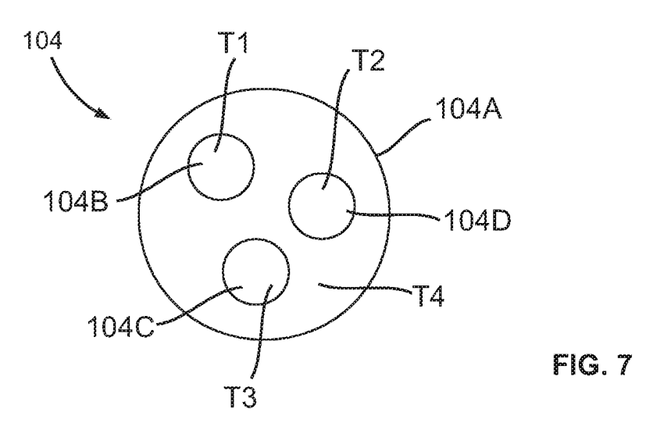
FIG. 7 is a cross-sectional view of a delivery sub-system of the injection and downhole-mixing system shown in FIG. 1, according to some alternative embodiments of this disclosure, wherein the delivery sub-system comprises an outer tubing and a plurality of inner tubings.

For example, FIG. 7 shown a delivery sub-system 104 comprises an outer tubing 104A receiving therein a plurality of inner tubings 104B, 104C and 104D. Each of the inner tubings 104B, 104C and 104D forms a delivery channels T1, T2, T3, for delivering a respective component group downhole. The annulus between the outer tubing 104A and the inner tubings 104B, 104C and 104D also forms a delivery channel T4 for delivering another component group downhole.

Although in above embodiments, the casing collar locator 136 is a mechanical collar locator, in some alternative embodiments, other types of locators such as electro-magnetic field based casing collar locators, may be used.

Although in above embodiments, the desired isolation location is determined by combining the measurement of the coiled tubing counter on surface and the detection of the casing collar locator 136 downhole, those skilled in the art will appreciate that in some alternative embodiments, the desired isolation location may be determined solely by the measurement of the coiled tubing counter, or solely by the detection of the location of the casing collar locator 136. Correspondingly, the system 100 may not comprise a casing collar locator in the embodiments wherein the desired isolation location is determined solely by the coiled tubing counter. In some other embodiments that the desired isolation location is determined solely by the casing collar locator, the system 100 may not comprise a coiled tubing counter.

In some alternative embodiments, the system 100 does not seal the isolation location during injection and mixing the components and thus, the system 100 may not comprise a packer 138.

In some alternative embodiments, the mixing tube 144 is not disposable.

In some alternative embodiments, the downhole injection tool 110 may not comprise any mixing tube 144. The chemical components may be directly discharged from the pressure-driven one-way valve assembly 142 into the wellbore 106 and mixed therein.

Although in above embodiments, the system and method are illustrated as injecting and mixing chemical components at or about an isolation point in a vertical wellbore or in a vertical section of a wellbore, the system and method may also be used for injecting and mixing chemical components at or about an isolation point in a horizontal wellbore or in a horizontal section of a wellbore.

Figure 8:
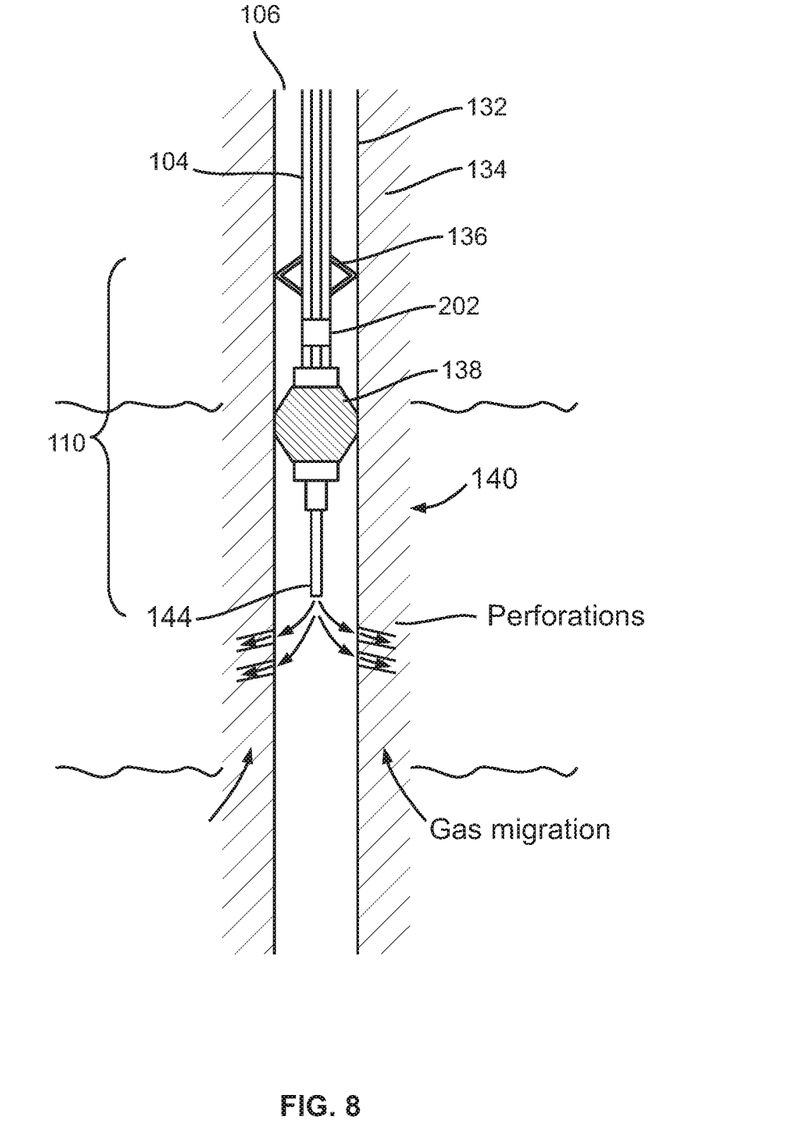
FIG. 8 is a schematic diagram illustrating the downhole injection tool of the injection and downhole-mixing system shown in FIG. 1, according to some alternative embodiments of this disclosure.

In some embodiments as shown in FIG. 8, the downhole injection tool 110 further comprises a shear section 202 above the packer 138. The shear section 202 may be sheared off by applying a predefined pulling force thereto. In the event that the downhole injection tool fails and the seal cannot release after the isolation mixture has solidified, the delivery sub-system 104 may be pulled uphole with sufficient force to break the shear section 202. The delivery sub-system 104 is then removed from the wellbore 106 while the downhole injection tool 110 is left behind therein.

In some embodiments similar to those shown in FIG. 8, the downhole injection tool 110 may be purposively left in the wellbore 106 after forming the solidified isolation material at a desired isolation location by pulling the delivery sub-system 104 uphole with sufficient force to break the shear section 202 each time after the solidified isolation material is formed at a desired isolation location.

The method and system described herein provide various advantages. For example, the surface storage, surface mixing, surface pumping, and delivery sub-system are kept from containing a product that will solidify during the operation. The surface storage, surface mixing, surface pumping, and delivery sub-systems only contain components that remain in their original forms for example, liquid or solid forms, for days, weeks, or even longer. If problems occur that prevent/delay injection, the components can be returned to their respective storage locations thereby significantly reducing the operation costs.

If needed, the downhole injection tool 110 may be safely maintained in the wellbore 106 about the desired isolation location while the isolation mixture is solidifying. When the downhole injection tool 110 is needed to remove from the wellbore 106, it may be pulled uphole to snap or shear off the disposable mixing tube, and then the downhole injection tool 110 may be removed from the wellbore 106.

The method and system disclosed herein can safely and effectively deliver and mix isolation mixtures that may set within a short period of time (for example, set within several minutes from mixing) thereby providing better properties for their intended downhole purpose. For example, the method and system disclosed herein are suitable for delivering resin components via fluidly separated channels downhole to a desired isolation location to form a solidified resin barrier which, compared to cement, has the advantage of faster set time, stronger strength, and longer life time. Moreover, the method and system disclosed herein significantly save operation time and cost by reducing waiting time on mixture solidifying and by reducing the required volumes of isolation mixtures.

With the method and system disclosed herein, the delivery sub-system and downhole injection tool are isolated from the solidifying mixture which ensures that the tool will not be stuck in wellbore due to contacting the solidified isolation material. This eliminates the risk of having to cut the equipment out of the hole and retrieve it, a costly operation known as "fishing".

The method and system disclosed herein eliminate the need for a retainer system in some cases. In the system disclosed herein, injection pressure isolated from uphole as with a traditional retainer but after product solidification, the injection system is recovered. This contrasts with the large expense of buying a retainer which will be sacrificed and left downhole to hold pressure. Later, if removal of the isolation material from the wellbore is required, only the isolation material itself needs to be drilled out, and no drilling of a steel or composite retainer is required. This drastically reduces drilling time and costs.

Although in the embodiments shown in FIG. 3, the wellbore 106 is a cased wellbore with a casing 132, in some embodiments, the wellbore 106 may be an open wellbore without any casing.

Although embodiments have been described above with reference to the accompanying drawings, those of skill in the art will appreciate that variations and modifications may be made without departing from the scope thereof as defined by the appended claims.

What is claimed is:

1. A method for providing a mixture downhole at or about a location in an open or cased wellbore, the method comprising:
   extending a retrievable delivery sub-system downhole through the wellbore, the delivery sub-system comprising a tubing assembly having at least two fluidly separated delivery channels;
   delivering two or more chemical components downhole through the retrievable delivery sub-system, each delivery channel delivering at least one of the two or more chemical components; and
   mixing the two or more chemical components to provide the mixture at or about the location by mixing the two or more chemical components in a downhole injection tool to provide the mixture and injecting the mixture into the wellbore at or about the location,
   wherein the downhole injection tool comprises a mixing tube, wherein the mixing tube is capable of being sheared off from the downhole injection tool under a pulling force.

2. The method of claim 1,
   wherein said mixing the two or more chemical components in the downhole injection tool to provide the mixture comprises:
   passing the two or more chemical components in a turbulent flow through a tortuous path of the mixing tube; and wherein said injecting the mixture into the wellbore at or about the location comprises: injecting the mixture from the mixing tube into the wellbore at or about the location.

3. The method of claim 1, further comprising:
preventing backflow in each delivery channel by using at least one pressure-driven one-way valve.

4. The method of claim 1, further comprising:
measuring a ratio of the two or more chemical components while delivering the two or more chemical components downhole.

5. The method of claim 4, wherein said delivering the two or more chemical components downhole through the retrievable delivery sub-system comprises:
ensuring delivering the two or more chemical components in a predefined ratio.

6. The method of claim 1, further comprising:
removing the delivery sub-system from the location.

7. The method of claim 1, further comprising:
allowing the mixture to solidify for forming an isolation material at or about the location.

8. The method of claim 1, further comprising:
shearing off the mixing tube; and
removing the delivery sub-system and the downhole injection tool from the location.

9. The method of claim 1, wherein said delivering two or more chemical components downhole through the retrievable delivery sub-system comprises:
delivering two or more chemical components downhole through the retrievable delivery sub-system with at least one of the two or more chemical components being in a liquid form or in a gas form, and each delivery channel delivering at least one of the two or more chemical components.

10. A system for providing a mixture downhole at or about a location in an open or cased wellbore, the system comprising:
a delivery sub-system retrievably extendable from surface through the wellbore, the delivery sub-system comprising a tubing assembly having at least two fluidly separated delivery channels, each delivery channel for delivering at least one of two or more chemical components; and
a downhole injection tool coupled to a downhole end of the delivery sub-system for receiving the two or more chemical components therefrom, mixing the two or more chemical components to form the mixture, and injecting the mixture into the wellbore at or about the location, wherein the downhole injection tool comprises a mixing tube, wherein the mixing tube is capable of being sheared off from the downhole injection tool under a pulling force.

11. The system of claim 10, wherein the downhole injection tool further comprises:
a mixing chamber for mixing the two or more chemical components.

12. The system of claim 11, wherein the mixing tube comprises a tortuous path for passing the two or more chemical components therethrough in a turbulent flow for mixing the two or more chemical components before injecting into the wellbore at or about the location.

13. The system of claim 11, wherein the mixing tube is disposable.

14. The system of claim 10, wherein each delivery channel comprises at least one pressure-driven one-way valve for preventing backflow.

15. The system of claim 10, wherein the delivery sub-system is adapted for measuring a ratio of the two or more chemical components while delivering the two or more chemical components downhole.

16. The system of claim 15, wherein the delivery sub-system is adapted for ensuring delivering the two or more chemical components in a predefined ratio.

17. The system of claim 10, wherein the delivery sub-system is adapted for delivering the two or more chemical components with at least one of the two or more chemical components in a liquid form or in a gas form.

18. The system of claim 10, wherein the delivery sub-system is adapted for delivering the two or more chemical components which, when mixed downhole, form a solidified material.

19. A system for providing a mixture downhole at or about a location in an open or cased wellbore, the system comprising:
a delivery sub-system comprising at least two fluidly separated delivery channels, each delivery channel for delivering at least one of two or more chemical components;
a downhole tool coupled to a downhole end of the delivery sub-system for receiving the two or more chemical components therefrom and mixing the two or more chemical components to form the mixture; and
a mixing tube for injecting the mixture into the wellbore at or about the location;
wherein the mixing tube is capable of being sheared off from the downhole injection tool under a pulling force and comprises a tortuous path for passing the two or more chemical components therethrough in a turbulent flow.

* * * * *